US011656989B2

(12) United States Patent
Hirko et al.

(10) Patent No.: US 11,656,989 B2
(45) Date of Patent: May 23, 2023

(54) MAINTAINING A CACHED VERSION OF A FILE AT A ROUTER DEVICE

(71) Applicant: Verizon Patent and Licensing Inc., Basking Ridge, NJ (US)

(72) Inventors: Jonathan Emerson Hirko, Brooklyn, NY (US); Rory Liam Connolly, Brooklyn, NY (US); Wei G. Tan, San Jose, CA (US); Nikolay Kulikaev, Jersey City, NJ (US); Manian Krishnamoorthy, Derry, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/644,400

(22) Filed: Dec. 15, 2021

(65) Prior Publication Data
US 2022/0107892 A1 Apr. 7, 2022

Related U.S. Application Data

(63) Continuation of application No. 16/742,589, filed on Jan. 14, 2020, now Pat. No. 11,216,374.

(51) Int. Cl.
*G06F 12/08* (2016.01)
*G06F 12/0802* (2016.01)
*H04L 67/568* (2022.01)

(52) U.S. Cl.
CPC ........ *G06F 12/0802* (2013.01); *H04L 67/568* (2022.05); *G06F 2212/60* (2013.01)

(58) Field of Classification Search
CPC . G06F 12/0802; G06F 2212/60; H04L 67/568
See application file for complete search history.

(56) References Cited

U.S. PATENT DOCUMENTS

| 2004/0103251 | A1  | 5/2004 | Alsup |
| 2009/0177840 | A1  | 7/2009 | Dale et al. |
| 2014/0122637 | A1  | 5/2014 | Wan et al. |
| 2019/0082009 | A1* | 3/2019 | Gupta ............... G06F 3/067 |
| 2020/0133860 | A1* | 4/2020 | Chen ............... G06F 11/1448 |

OTHER PUBLICATIONS

"Amber", AI—Powered Smart Storage Platform. Latticework, Inc., Jun. 2018.
"Panzura Freedom 8, Accelerating Your Digital Transformation Journey", Panzura, Inc., Campbell, CA US 2019.

* cited by examiner

*Primary Examiner* — Jae U Yu

(57) ABSTRACT

A router device may receive a copy of a file. The router device may identify metadata associated with the copy of the file. The router device may process the metadata to identify a priority position in a first data structure associated with the router device. The router device may cause a copy of the file to be stored as a cached version of the file at the priority position in the first data structure. The router device may generate a copy of the cached version of the file. The router device may send the copy of the cached version of the file to a user device.

20 Claims, 16 Drawing Sheets

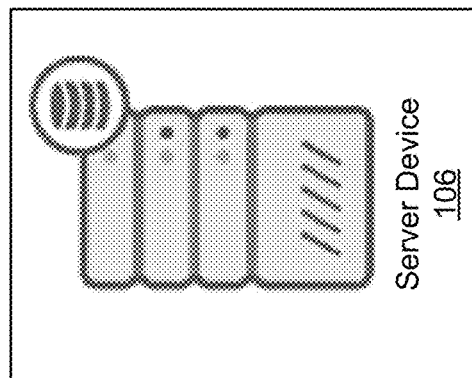
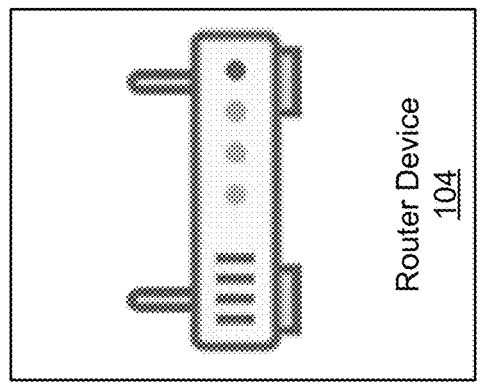
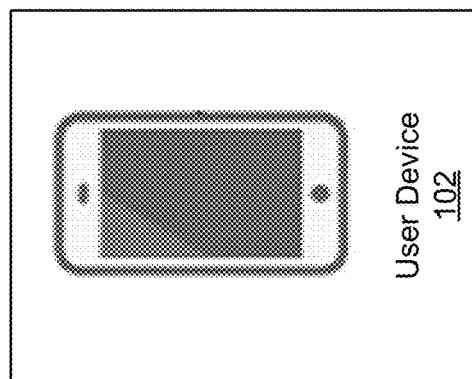
FIG. 1A

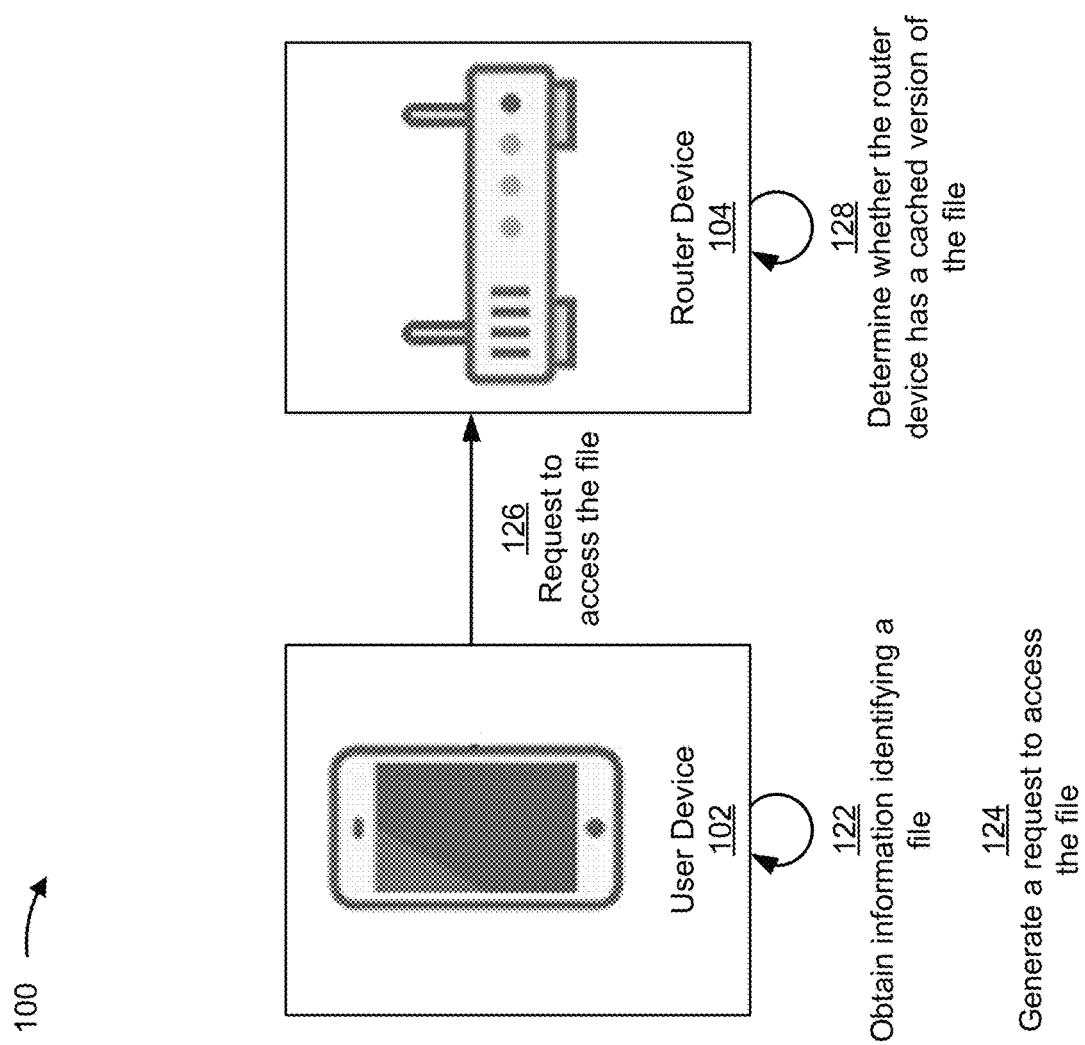

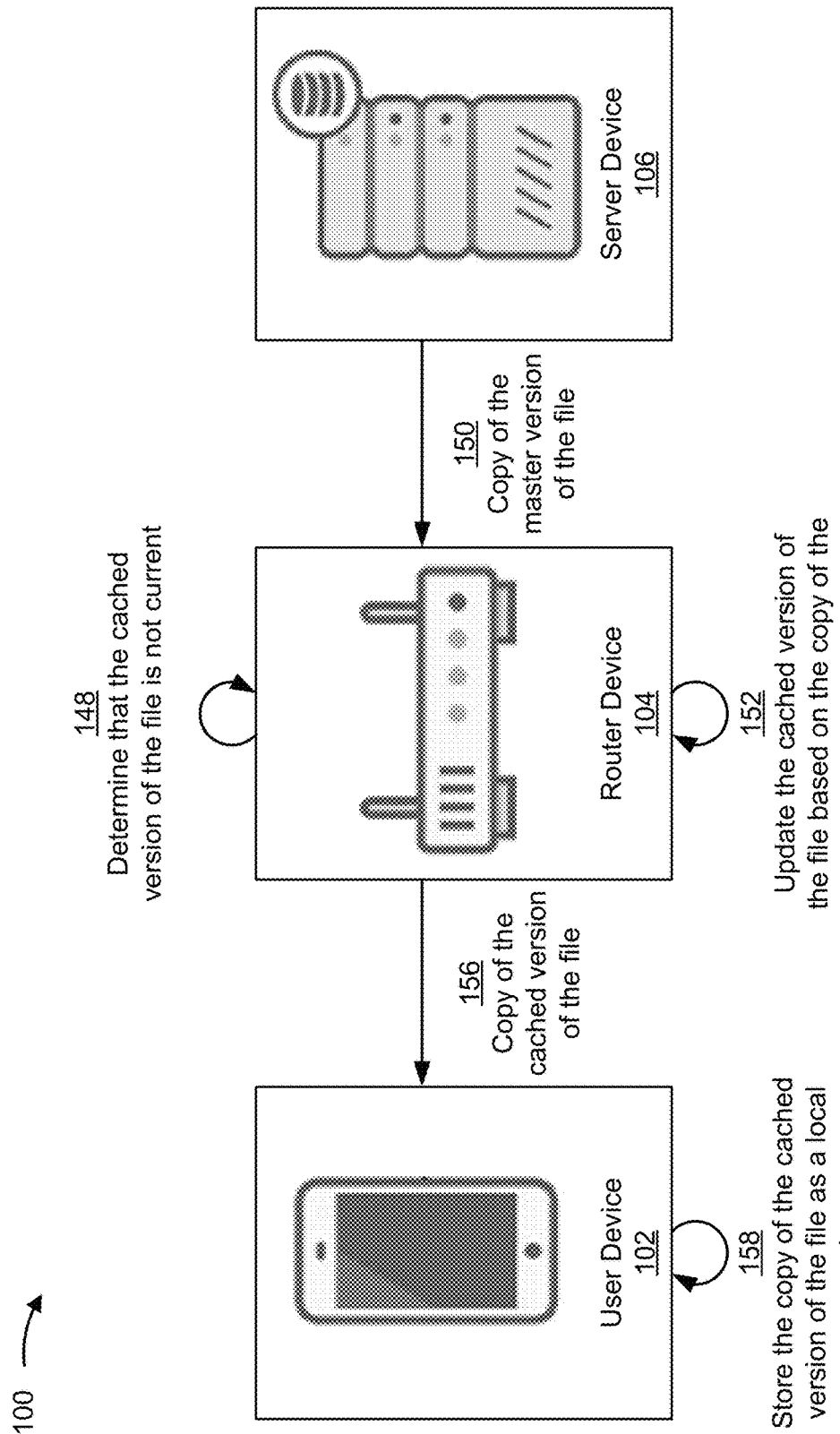

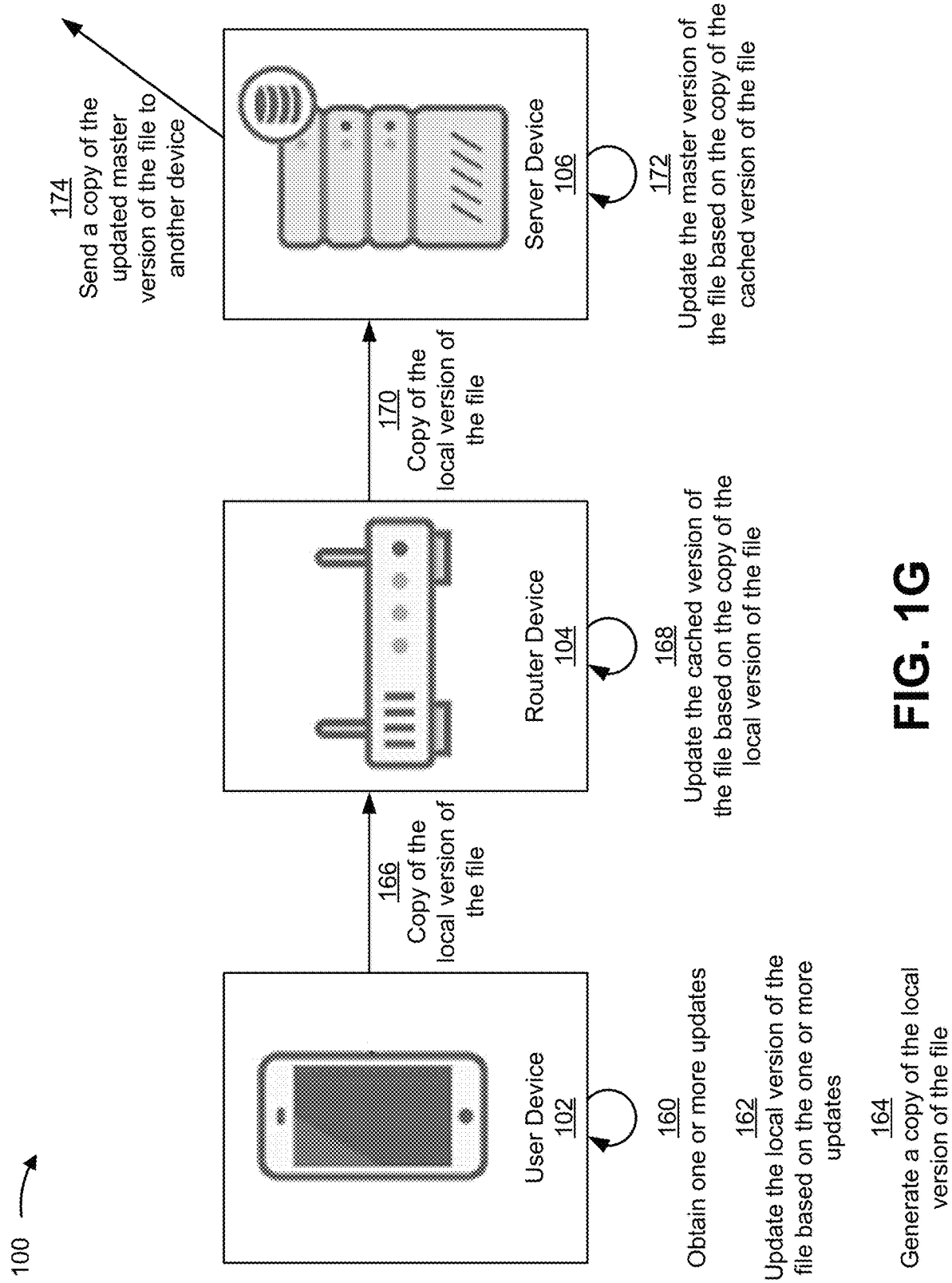

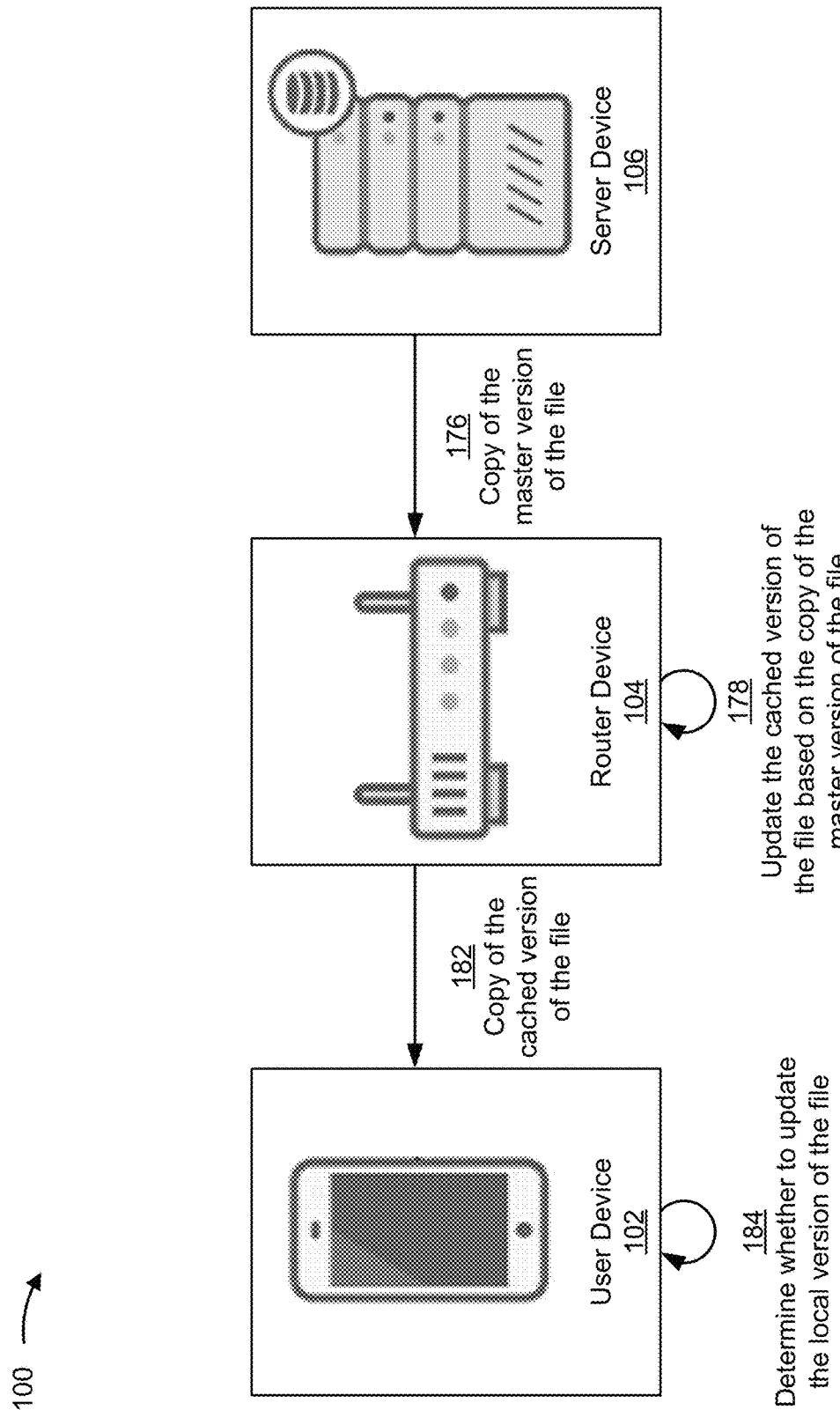

"MAINTAINING A CACHED VERSION OF A FILE AT A ROUTER DEVICE

RELATED APPLICATION

This application is a continuation of U.S. patent application Ser. No. 16/742,589, filed Jan. 14, 2020, and entitled "MAINTAINING A CACHED VERSION OF A FILE AT A ROUTER DEVICE," which is incorporated herein by reference in its entirety.

BACKGROUND

A cloud storage service provides a system to remotely store, back up, and/or recover computer files. The cloud storage service may include one or more server devices that store the computer files. A user device may communicate with the one or more server devices (e.g., via a network) to access, update, modify, and/or delete the computer files.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1B:
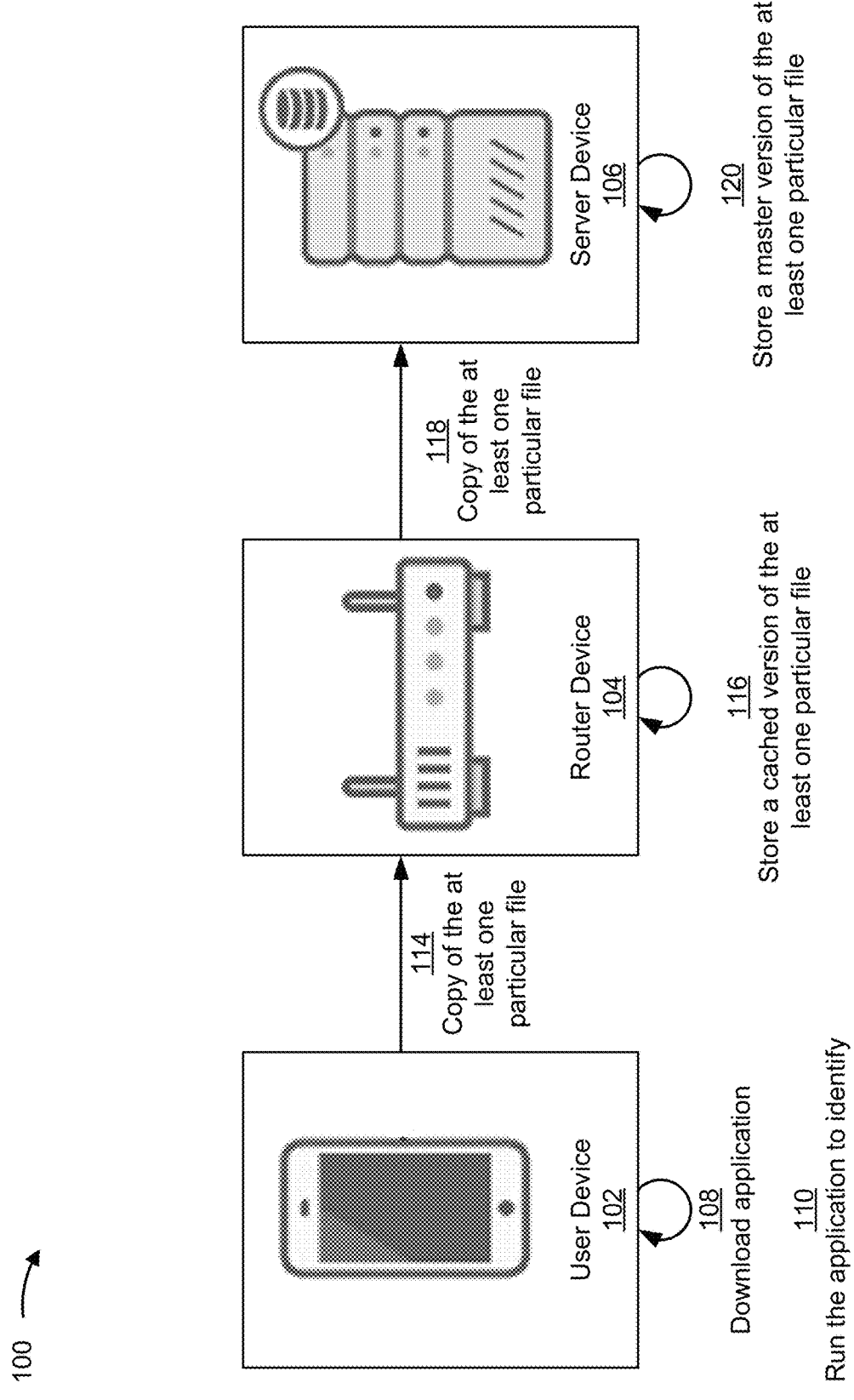

The following detailed description of example implementations refers to the accompanying drawings. The same reference numbers in different drawings may identify the same or similar elements.

In many instances, a user of a user device may want to use a cloud storage service to store (e.g., back up and/or maintain a copy of) a file (e.g., a document file, a picture file, a video file, an audio file, and/or the like). In some cases, the user device may communicate with one or more server devices associated with the cloud storage service to access, update, and/or save the file. However, due to a physical distance between the user device and the one or more server devices, there can be latency, or delay, in the amount of time required for the user device to communicate with (e.g., send a request to and receive a response from) the one or more server devices. Moreover, the amount of latency can be large when the user device and the one or more server devices communicate a large file (e.g., a file that is greater than a threshold size, such as 50 megabytes). This negatively affects utility of the cloud storage service because the user device and/or the one or more server devices may need to wait for the entire file to be communicated before being able to perform one or more processes concerning the file. The amount of latency associated with the user device communicating with the one or more server devices further increases as the physical distance between the user device and the one or more server devices increases, as the number of network links/nodes between the user device and the one or more server devices increases, and/or the like.

Some implementations described herein provide a router device (e.g., that provides a user device with access to a network) that includes or provides access to a data structure to store a cached version of a file. In some implementations, the router device may communicate with the user device and/or a server device (e.g., associated with a cloud computing environment) to update and/or maintain the cached version of the file in the data structure. For example, in some implementations, a user of the user device may input (e.g., via a user interface of the user device and via an application running on the user device) information identifying the file (e.g., to view and/or modify the file) and the user device (via the application) may send, to the router device, a request to access the file. The router device may determine that the data structure associated with the router device includes a cached version of the file, may communicate with the server device to determine that the cached version of the file is current (e.g., based on a master version of the file stored in a data structure associated with the server device), and may send a copy of the cached version of the file to the user device. As another example, in some implementations, the server device may send a copy of an updated master version of the file to the router device, the router device may update the cached version of the file in the data structure associated with the router device based on the copy of the updated master version of the file, and the router device may send a copy of the updated cached version of the file to the user device.

In this way, the router device enables a cached version of the file to be maintained in a data structure associated with the router device. This allows the user device to communicate with just the router device, which typically is within a close physical proximity of the user device, to access, update and/or save the file. This may remove and/or reduce an amount of latency involved with accessing, updating, and/or saving the file in the cloud that would otherwise be present when the user device communicates with the server device to access, update and/or save the file. Furthermore, resources of the server device (e.g., processing resources, memory resources, power resources, networking resources, and/or the like) that would have been used to otherwise communicate with the user device may be conserved.

FIGS. 1A-1I are diagrams of one or more example implementations 100 described herein. As shown in FIG. 1A, example implementation(s) may include a user device 102, a router device 104, and/or a server device 106. The router device 104 may provide the user device 102 with access to a network (e.g., the Internet). The server device 106 may be associated with a cloud computing environment (e.g., that provides a cloud storage service).

In some implementations, the user device 102 may facilitate transferring one or more configuration settings from an existing router device (not shown in FIGS. 1A-1I) to the router device 104 (e.g., when the router device 102 is first initialized to provide the user device and/or other devices with access to the network). The one or more configuration settings may include one or more service set identifiers (SSIDs), one or more passwords (e.g., associated with the one or more SSIDs, the existing router device, one or more user devices associated with the existing router device, and/or the like), one or more internet protocol (IP) addresses associated with the one or more user devices associated with the existing router device, one or more identifiers associated with the one or more user devices associated with the existing router device (e.g., one or more respective media access control (MAC) addresses), and/or the like. In some implementations, the user device 102 may communicate with the existing router device to obtain the one or more configuration settings, may save the one or more existing configuration settings in a data structure that is included in or is accessible to the user device 102, and/or may send the one or more existing configuration settings to the server device 106 (or another server device) to cause the server device 106 to save the one or more existing configuration settings in a data structure that is included in or is accessible to the server device 106. The router device 104 may communicate with the user device 102 and/or the server device 106 to obtain and implement the one or more configuration settings. In this way, the router device 104 may be provisioned with the one or more configuration settings without a user of the user device 102 needing to manually input any of the one or more configuration settings into the router device 104.

As shown in FIG. 1B and by reference number 108, the user of the user device 102 may interact with the user device 102 (e.g., via a user interface of the user device 102) to cause the user device 102 to download an application (e.g., via the network). As shown by reference number 110, the user device 102 may run the application to analyze a data structure associated with the user device 102 (e.g., a data structure included in or accessible to the user device 102) to identify a set of files of a plurality of files (e.g., one or more document files, one or more image files, one or more video files, one or more audio files, and/or the like) stored in the data structure.

For example, the user device 102 may identify one or more directory locations included in the data structure and may search the one or more directory locations to identify the plurality of files. The user device 102 may identify one or more high-value files of the plurality of files (e.g., one or more particular files that have one or more characteristics that would make offloading the files from the data structure associated with the user device 102 useful). The user device 102 may determine that a file is a high-value files when the file is associated with the user and/or the user device 102 (e.g., the file may have been generated and/or modified by the user and/or the user device 102); the file is of a particular file type (e.g., the file is a document file, an image file, a video file, an audio file, and/or the like); the file is of a particular size (e.g., the size of the file is less than a first particular threshold file size, greater than equal to the first particular threshold file size and less than a second particular threshold file size, greater than or equal to the second particular threshold size, and/or the like); the file has a particular frequency of use (e.g., the file is used rarely, occasionally, frequently, and/or the like); the file is stored in a particular directory location (e.g., a rarely used directory location, an occasionally used directory location, a frequently used directory location, and/or the like); and/or the like. The user device 102 may identify the one or more high-value files as the set of files.

In some implementations, the application may present information identifying the set of files to the user of the user device 102 (e.g., via a display of the user device 102). As shown by reference number 112, the user may interact with the user device 102 to cause the user device 102 to select at least one particular file of the set of files (e.g., to be backed up to the router device 104 and/or the server device 106). For example, the user may interact with the user device 102 to cause user device 102 to select the at least one particular file to be included in a virtual directory location (e.g., a virtual folder). When included in the virtual directory location, the at least one particular file may be stored as a local version, a cached version, and/or a master version in data structures respectively associated with different devices, as described herein. Further detail regarding the virtual directory location is described herein in relation to FIG. 1I.

As shown by reference number 114, to include the at least one particular file in the virtual directory location, the user device 102 may send a copy of the at least one particular file to the router device 104. As shown by reference number 116, the router device 104 may store the copy of the at least one particular file as a cached version of the at least one particular file in a data structure associated with the router device 104 (e.g., a data structure that is included in the router device 104 and/or accessible to the router device 104, such as via a different server device connected to the router device 104).

The data structure associated with the router device 104 may be a priority queue, such that only files that are recent, important, and/or like are cached in the data structure. For example, the router device 104 may identify metadata associated with a copy of a particular file (e.g., of the at least one particular file) to identify a priority position in the data structure associated with the router device 104 and may cause the copy of the particular file to be stored as a cached version of the particular file at the priority position in the data structure associated with the router device 104. The metadata may include information indicating a number of accesses or opens associated with the particular file, information indicating where other cached versions of the particular file are located, information indicating a last access date associated with the particular file, information indicating a creation date of the particular file, information indicating a last access location and/or last device associated with the particular file, information indicating whether the particular file is a favorite file (e.g., of the user of the user device 102), information indicating whether the user and/or the user device 102 is associated with the particular file, information indicating a size of the particular file, information indicating a type of the particular file (e.g., a document file, an image file, a video file, an audio file, and/or the like), and/or the like.

In some implementations, the router device 104 may process the metadata (e.g., using a metadata weighting algorithm) to determine a priority score (also referred to as a "priority queue weight") associated with the copy of the particular file. The router device 104 may determine the priority position to store the cached version of the particular file based on the priority score. For example, the router device 104 may identify a priority position that is after a higher priority position (e.g., a position associated with a cached version of a file with a priority score greater than the priority score of the copy of the particular file) and/or before a lower priority position (e.g., a position associated with a cached version of a file with a priority score less than or equal to the priority score of the copy of the particular file). The user device 102 may cause the cached version of the particular file to be stored in the priority position in the data structure.

In some implementations (e.g., when the data structure associated with the router device 104 is full, a threshold number of files to be stored by the data structure associated with the router device 104 has been satisfied, and/or the like), the router device 104 may cause a cached version of another file (e.g., a file associated with a lowest priority position in the data structure) to be removed, deleted, discarded, and/or the like from the data structure associated with the router device 104. This allows the cached version of the particular file to be stored at the priority position in the data structure associated with the router device 104. In this way, only high priority cached versions of files are stored in the data structure associated with the router device 104. This may remove and/or reduce an amount of latency involved with accessing, updating, and/or saving high priority files in the cloud that would otherwise be present when the user device communicates with the server device to access, update and/or save the file.

As shown by reference number 118, the router device 104 may send the copy of the at least one particular file to the server device 106. As shown by reference number 120, the server device 106 may store the copy of the at least one particular file as a master version of the at least one particular file in a data structure associated with the server device 106 (e.g., a data structure that is included in the server device 106 and/or accessible to the server device 106). In this way, the user device 102 may cause the at least one particular file to be backed up, copied, and/or the like by the router device 104 and/or the server device 106.

After causing the at least one particular file to be backed up, copied, and/or the like by the router device 104 and/or the server device 106, the at least one particular file may be part of the virtual directory location (e.g., the virtual folder). In some implementations, a directory browser of the user device 102 may indicate that the at least one particular file is part of the virtual directory location (e.g., by showing a unique file icon or indicator associating the file with the virtual directory). Further detail regarding the virtual directory location is described herein in relation to FIG. 1I.

As shown in FIG. 1C and by reference number 122, the user device 102 may obtain information identifying a file (e.g., for a user of the user device 102 to view and/or modify) that is backed up to the router device 104 and/or the server device 106 (e.g., a cached version of the file is stored in the data structure associated with the router device 104 and/or a master version of the file is stored in the data structure associated with the server device 106). For example, the user may interact with the user device 102 (e.g., select the file in the directory browser of the user device 102 via the user interface of the of the user device 102) to input the information identifying the file into the user device 102.

As shown by reference number 124, the user device 102 may generate a request to access the file (e.g., based on the information identifying the file). As shown by reference number 126, the user device 102 may send the request to access the file to the router device 104. As shown by reference number 128, the router device 104 may determine whether a cached version of the file is stored in the data structure associated with the router device 104 (e.g., based on the request to access the file).

When the router device 104 determines that no cached version of the file is stored in the data structure associated with the router device 104, the router device 104 may obtain a copy of the master version of the file from the server device 106. For example, the router device 104 may send a request for a copy of the master version of the file to the server device 106 and the server device 106, based on the request for the copy of the master version of the file, may generate and send the copy of the master version of the file to the router device 104. The router device 104 may identify metadata associated with the copy of the master version of the file, such as information indicating a number of accesses or opens associated with the file, information indicating where other cached versions of the file are located, information indicating a last access date associated with the file, information indicating a creation date of the file, information indicating a last access location and/or last device associated with the file, information indicating whether the file is a favorite file, information indicating whether the user and/or the user device 102 is associated with the file, information indicating a size of the file, information indicating a type of the file (e.g., a document file, an image file, a video file, an audio file, and/or the like), and/or the like. The router device 104 may process the metadata to identify a priority position in the data structure associated with the router device and may cause the copy of the master version of the file to be stored as the cached version of the file at the priority position in the data structure associated with the router device.

Figure 1D:
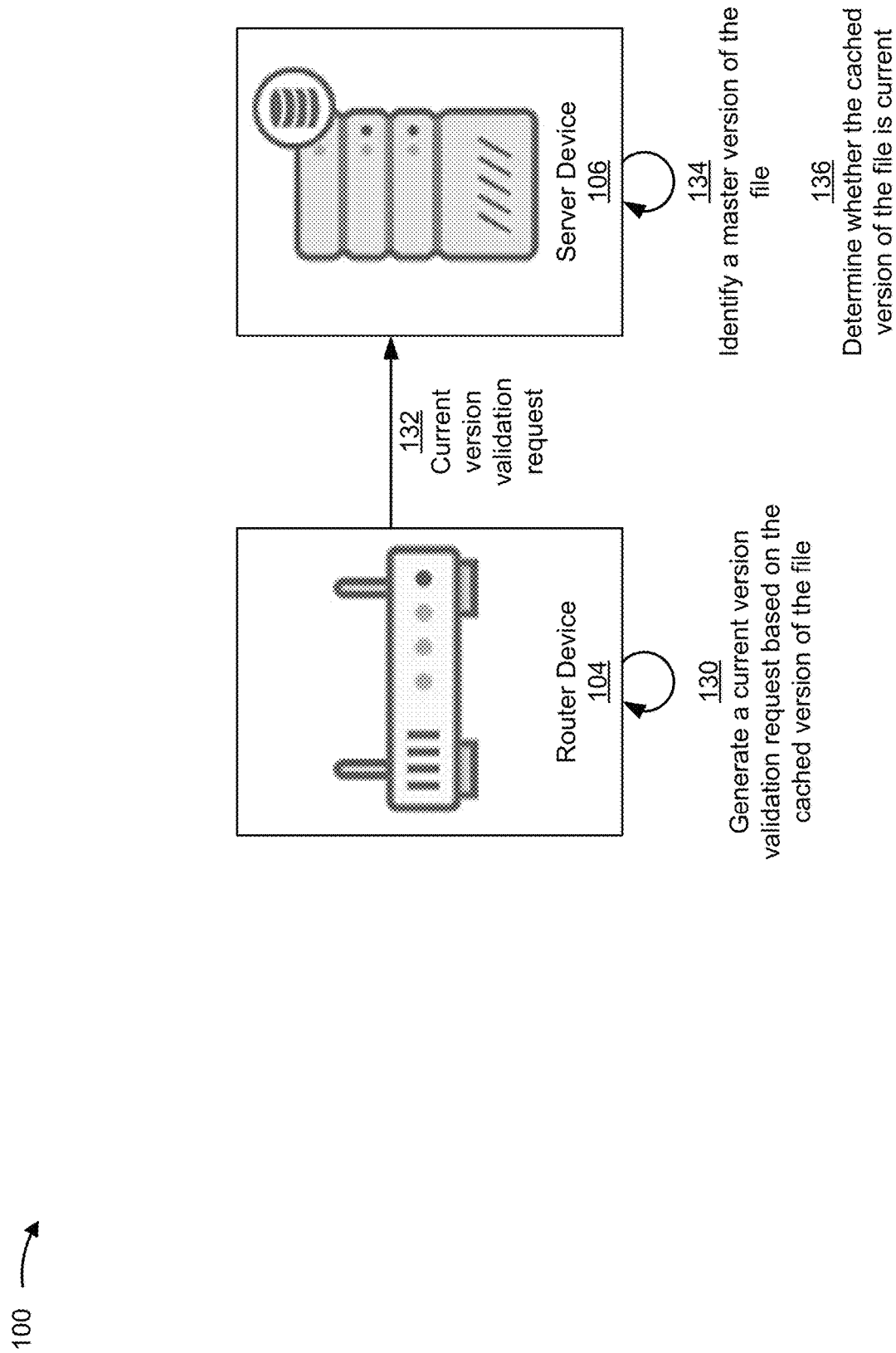

As shown in FIG. 1D and by reference number 130, when the router device 104 determines that a cached version of the file is stored in the data structure associated with the router device 104 (e.g., after causing the copy of the master version of the file to be stored as the cached version of the file at the priority position in the data structure associated with the router device), the router device 104 may generate a current version validation request (e.g., a request to validate that the cached version of the file is current). For example, the router device 104 may process the cached version of the file using a validation procedure (e.g., a hashing procedure, a checksum procedure, and/or the like) to generate a representative value of the cached version of the file. The router device 104 may include the representative value in the current version validation request. As shown by reference number 132, the router device 104 may send the current version validation request to the server device 106.

As shown by reference number 134, the server device 106 may identify a master version of the file (e.g., based on the current version validation request) in the data structure associated with the server device 106. As shown by reference number 136, the server device 106 may determine whether the cached version of the file is current. For example, the server device 106 may process the current version validation request to identify the representative value of the cached version of the file that is included in the current version validation request. The server device 106 may identify the validation procedure that was used to generate the representative value of the cached version of the file and may process the master version of the file using the validation procedure to generate a representative value of the master version of the file. The server device 106 may determine that the cached version of the file is current when the representative value of the cached version of the file and the representative value of the master version of the file match, are equal, and/or the like. Additionally, or alternatively, the server device 106 may determine that the cached version of the file is not current when the representative value of the cached version of the file and the representative value of the master version of the file do not match, are not equal, and/or the like.

Figure 1E:
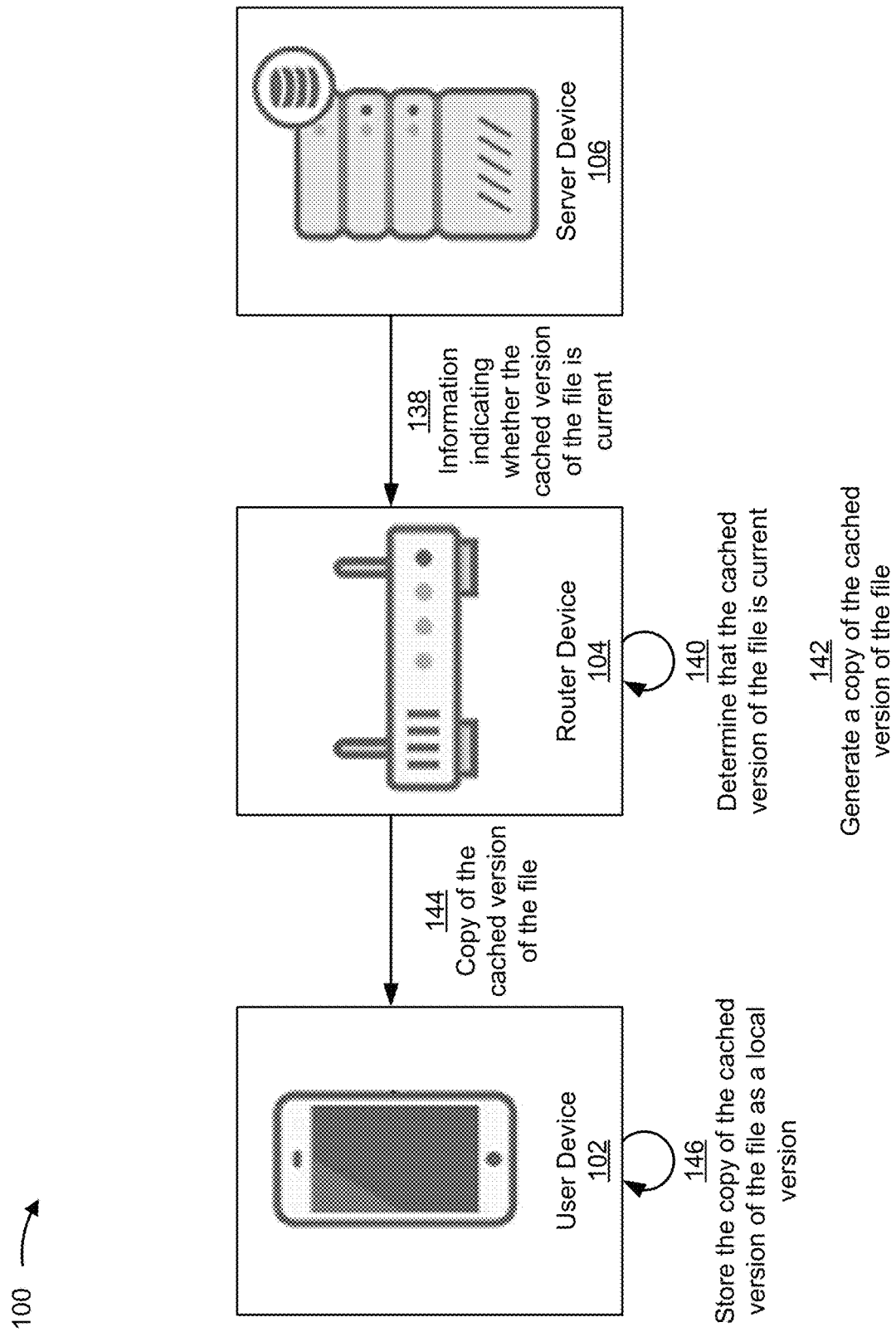

As shown in FIG. 1E and by reference number 138, the server device 106 may send, to the router device 104, information indicating whether the cached version of the file has been determined to be current. For example, when the server device 106 has determined that the cached version of the file is current, the server device 106 may send a current version validation confirmation to the router device 104. Additionally, or alternatively, when the server device 106 has determined that the cached version of the file is not current, the server device 106 may send a current version validation denial to the router device 104. In some implementations, the router device 104 may process (e.g. parse) the information to determine whether the cached version of the file is current.

As shown by reference number 140, in some implementations, the router device 104 may determine that the cached version of the file is current (e.g., based on processing the information). As shown by reference number 142, the router device 104 may generate a copy of the cached version of the file (e.g., based on determining that the cached version of the file is current). As shown by reference number 144, the router device 104 may send the copy of the cached version of the file to the user device 102. As shown by reference number 146, the user device 102 may store the copy of the cached version of the file as a local version of the file in the data structure associated with the user device 102.

Additionally, or alternatively, as shown in FIG. 1F and by reference number 148, the router device 104 may determine that the cached version of the file is not current (e.g., based on processing the information). As shown by reference number 150, the router device 104 may obtain a copy of the master version of the file from the server device 106 (e.g., based on determining that the cached version of the file is not current). For example, the router device 104 may send a request for a copy of the master version of the file to the server device 106 and the server device 106, based on the request for the copy of the master version of the file, may generate and send the copy of the master version of the file to the router device 104. As shown by reference number 152, the router device 104 may update the cached version of the file based on the copy of the master version of the file. For example, the router device 104 may store the copy of the master version of the file as the cached version of the file in the data structure associated with the router device 104. As another example, the router device 104 may identify one or more differences between the copy of the master version of the file and the cached version of the file and may update the cached version of the file based on the one or more differences.

As shown by reference number 154, the router device 104 may generate a copy of the cached version of the file (e.g. after updating the cached version of the file). As shown by reference number 156, the router device 104 may send the copy of the cached version of the file to the user device 102. As shown by reference number 158, the user device 102 may store the copy of the cached version of the file as a local version of the file in the data structure associated with the user device 102.

As shown in FIG. 1G and by reference number 160, the user device 102 may obtain one or more updates associated with the local version of the file. For example, the user of the user device 102 may interact with the user device 102 (e.g., via the user interface of the user device 102) to input the one or more updates into the user device 102. As shown by reference number 162, the user device 102 may update the local version of the file based on the one or more updates. For example, the user device 102 may update and store, based on the one or more updates, the local version in the data structure associated with the user device 102. As shown by reference number 164, the user device 102 may generate a copy of the local version of the file (e.g. after updating the local version of the file). As shown by reference number 166, the user device 102 may send the copy of the local version of the file to the router device 104. As shown by reference number 168, the router device 104 may update the cached version of the file based on the copy of the local version of the file. For example, the router device 104 may store the copy of the local version of the file as the cached version of the file in the data structure associated with the router device 104. As another example, the router device 104 may identify one or more differences between the copy of the local version of the file and the cached version of the file and may update the cached version of the file based on the one or more differences.

As shown by reference number 170, the router device 104 may send the copy of the local version of the file to the server device 106. Additionally, or alternatively, the router device 104 may generate and send a copy of the cached version of the file (e.g. after updating the cached version of the file) to the server device 106. In some implementations, the router device 104 may determine a transmission time to send the copy of the local version of the file or the copy of the cached version of the file to the server device 106 and may send the copy of the local version of the file or the copy of the cached version of the file to the server device 106 at the determined transmission time. For example, the router device 104 may identify one or more network conditions associated with the router device 104 (e.g., bandwidth conditions, latency conditions, and/or the like) and determine the transmission time based on the one or more network conditions. For example, the transmission time may be when the router device 104 is able to handle sending the copy of the local version of the file or the copy of the cached version of the file without affecting other incoming or outgoing traffic handled by the router device 104.

As shown by reference number 172, the server device 106 may update the master version of the file based on the copy of the local version of the file or the copy of the cached version of the file. For example, the server device 106 may store the copy of the local version of the file or the copy of the cached version of the file as the master version of the file in the data structure associated with the server device 106. As another example, the server device 106 may identify one or more differences between the copy of the local version of the file or the copy of the cached version of the file and the master version of the file and may update the master version of the file based on the one or more differences.

As shown by reference number 174, the server device 106 may send a copy of the master version of the file (e.g., after updating the master version of the file) to another device. For example, the server device 106 may identify another device that stores another version of the file (e.g., another router device that stores another cached version of the file) in a data structure associated with the other device and may send the copy of the master version of the file to the other device (e.g., to cause the other device to update the other version of the file).

Additionally, or alternatively, as shown in FIG. 1H and by reference number 176, the server device 106 may send a copy of the master version of the file to the router device 104 (e.g., after the server device 106 updated the master version of the file based on receiving another version of the file from another device). As shown by reference number 178, the router device 104 may update the cached version of the file based on the copy of the master version of the file in a similar manner as described herein in relation to FIG. 1F and reference number 152. As shown by reference number 180, the router device 104 may generate a copy of the cached version of the file (e.g. after updating the cached version of the file). As shown by reference number 182, the router device 104 may send the copy of the cached version of the file to the user device 102.

As shown by reference number 184, the user device 102 may determine whether to update the local version of the file based on the copy of the cached version of the file. For example, the user device 102 may cause display (e.g., on a display of the user device 102) of a message indicating that the copy of the cached version of the file has been received by the user device 102. The user device 102 may receive (e.g. from the user via the user interface of the user device 102) input indicating whether the local version of the file is to be updated. When the input indicates that the local version of the file is to be updated, the user device 102 may cause the local version of the file to be updated (e.g., the user device 102 may store the copy of the cached version of the file as the local version of the file in the data structure associated with the user device 102). Additionally, or alternatively, when the input indicates that the local version of the file is not to be updated, the user device 102 may discard the copy of the cached version of the file.

Additionally, or alternatively, the user device 102 may determine to offload the local version of the file from the data structure associated with the user device 102. The user device 102 may offload the local version of the file by removing, deleting, discarding, and/or the like the local version of the file from the data structure associated with the user device 102 and/or adding a link (e.g., also referred to as a "zero-byte" file representation) that links to the cached version of the file (e.g., stored in the data structure associated with the router device 104) and/or the master version of the file (e.g., stored in the data structure associated with the server device 106).

In some implementations, the user device 102 may determine to offload the local version of the file after the user device updates and stores the local version of the file (e.g., as described herein in relation to FIG. 1G). For example, the user device 102 may close the local version of the file (e.g., after the user is done inputting updates associated with the local version of the file) and offload the local version of the file (e.g., upon closing the local version of the file, after a particular period of time, and/or the like). Accordingly, the local version of the file may be removed from a directory location of the data structure associated with the user device 102 and/or a link to the cached version of the file and/or the master version of the file may be added to the directory location. After offloading the local version of the file, the user device 102 may access the cached version of the file and/or the master version of the file in a similar manner as described herein in relation to FIGS. 1C-1F (e.g., by generating a request to access the file based on the user interacting with the user device 102 to indicate the link to the cached version of the file and/or the master version of the file) to allow the user of the user device 102 to view, edit, and/or modify the file.

In some implementations (e.g., when the data structure associated with the user device 102 is full, a threshold number of files to be stored by the data structure associated with the user device 102 has been satisfied, and/or the like), the user device 102 may run an application (e.g., the application described in relation to FIG. 1B) to identify one or more local versions of files to offload from the data structure associated with the user device 102. For example, the user device 102 may identify one or more directory locations included in the data structure and may search the one or more directory locations to find and/or identify one or more local versions of files that have been backed up to the router device 104 and/or the server device 106. The user device 102 may identify respective metadata associated with each file of the one or more backed up files and may determine, based on the respective metadata, a respective priority score associated with each file (e.g., in a similar manner as described herein in relation to FIG. 1B and reference number 116). The user device 102 may identify the one or more local versions of files to offload based on the respective priority scores (e.g., the user device 102 may select a set of files with the highest priority scores to offload, a set of files with the lowest priority scores to offload, and/or the like) and cause them to be offloaded from the data structure associated with the user device 102.

Additionally, or alternatively, the user device 102 may remove, delete, discard, and/or the like a local version of a file (e.g., even when not offloading the local version of the file). For example, the user of the user device 102 may interact with the user device 102 (e.g., via the user interface of the user device 102) to indicate that the local version of the file is to be removed, deleted, discarded, and/or the like and the user device 102 may cause the local version of the file to be removed, deleted, discarded, and/or the like from the data structure associated with the user device 102. After removing, deleting, discarding, and/or the like the local version of the file from the data structure associated with the user device 102, the user device 102 may access the cached version of the file and/or the master version of the file in a similar manner as described herein in relation to FIGS. 1C-1F to allow a user of the user device 102 to view, edit, and/or modify the file.

Figure 1I:
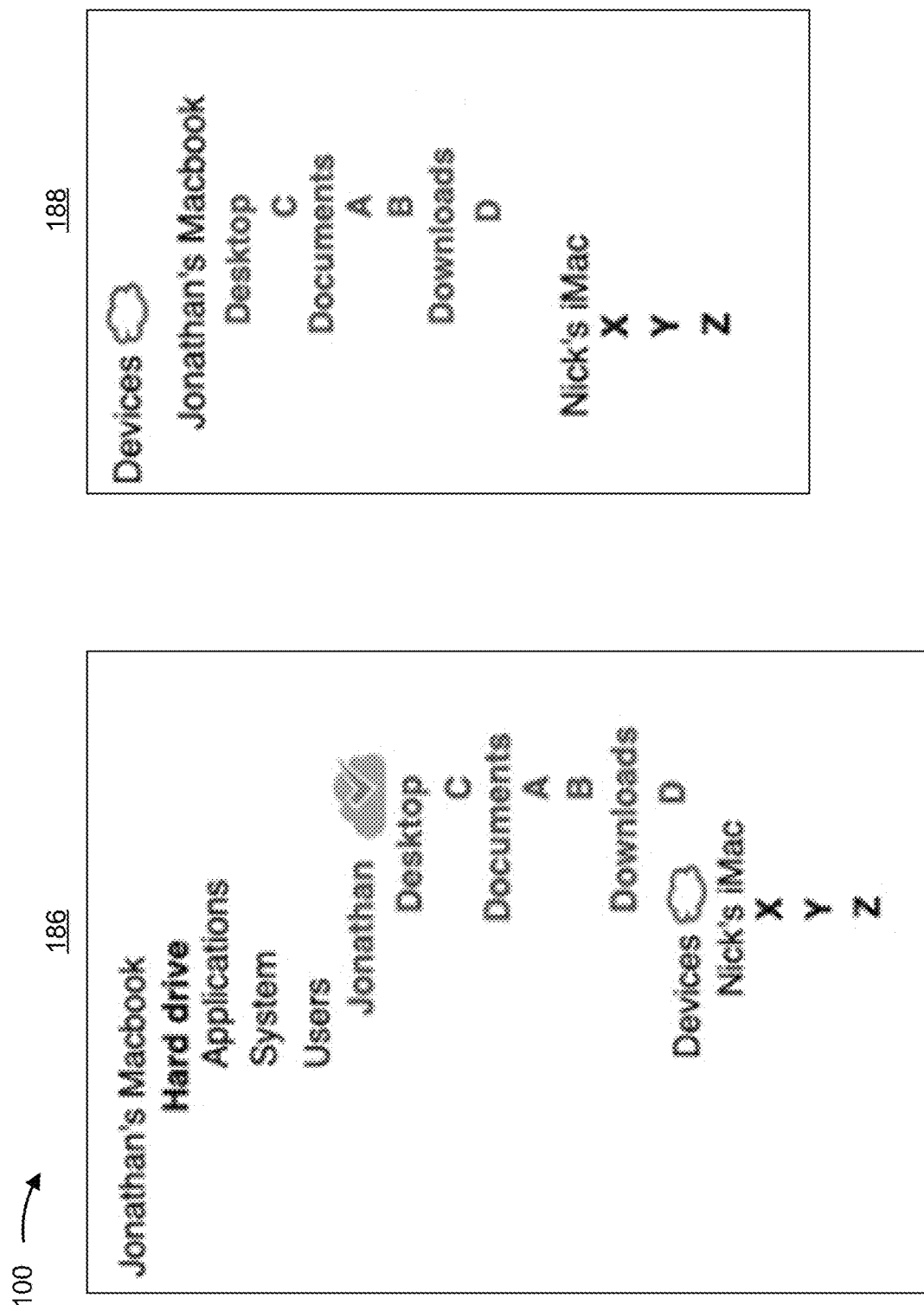

As shown in FIG. 1I, the virtual directory location (e.g., the virtual folder) may be viewable to a user of the user device 102. For example, a directory browser of the user device 102 may indicate one or more files and/or one or more links to files (e.g., also referred to as a "zero-byte" file representations) of the user device 102 that are backed up the router device 104 and/or the server device 106. As shown by reference number 186, an example directory browser shows (e.g., via a cloud icon) that the files and/or links (e.g., files or links labeled as "A," "B," "C,", and "D") in the "Jonathan" directory of the user device 102 are backed up to the router device 104 and/or the server device 106. In some implementations, the virtual directory location may include files associated with one or more other user devices that are accessible to the user device 102. In such a case, the directory browser of the user device 102 may show a "Devices" directory that identifies the one or more other user devices (e.g., shown as "Nick's iMac") and include links (e.g., shown as links labeled "X," "Y," and "Z") to files associated with the one or more other user devices that are backed up to the router device 104 and/or the server device 106. The user device 102 may access any of the files and/or links displayed in the directory browser as described herein.

In some implementations, the virtual directory location may be similarly viewable to a user of the user device 102 via a web portal associated with the virtual directory location (e.g., hosted by the server device 106 or another device associated with the server device 106). For example, the web portal may show a "Devices" directory that identifies the user device 102 and/or the one or more other user devices and include links to the files associated with the user device 102 and/or the one or more other user devices that are backed up to the router device 104 and/or the server device 106. As shown by reference number 188, the example web portal shows a "Devices" directory that identifies the user devices "Jonathan's Macbook" and "Nick's iMac" and respective links to files (e.g., shown as links labeled as "A," "B," "C,", "D," "X," "Y," and "Z") associated with the user devices that have been backed up to the router device 104 and/or the server device 106. The user device 102 may access any of the links displayed in the web portal as described herein.

As indicated above, FIGS. 1A-1I are provided as one or more examples. Other examples can differ from what is described with regard to FIGS. 1A-1I.

Figure 2:
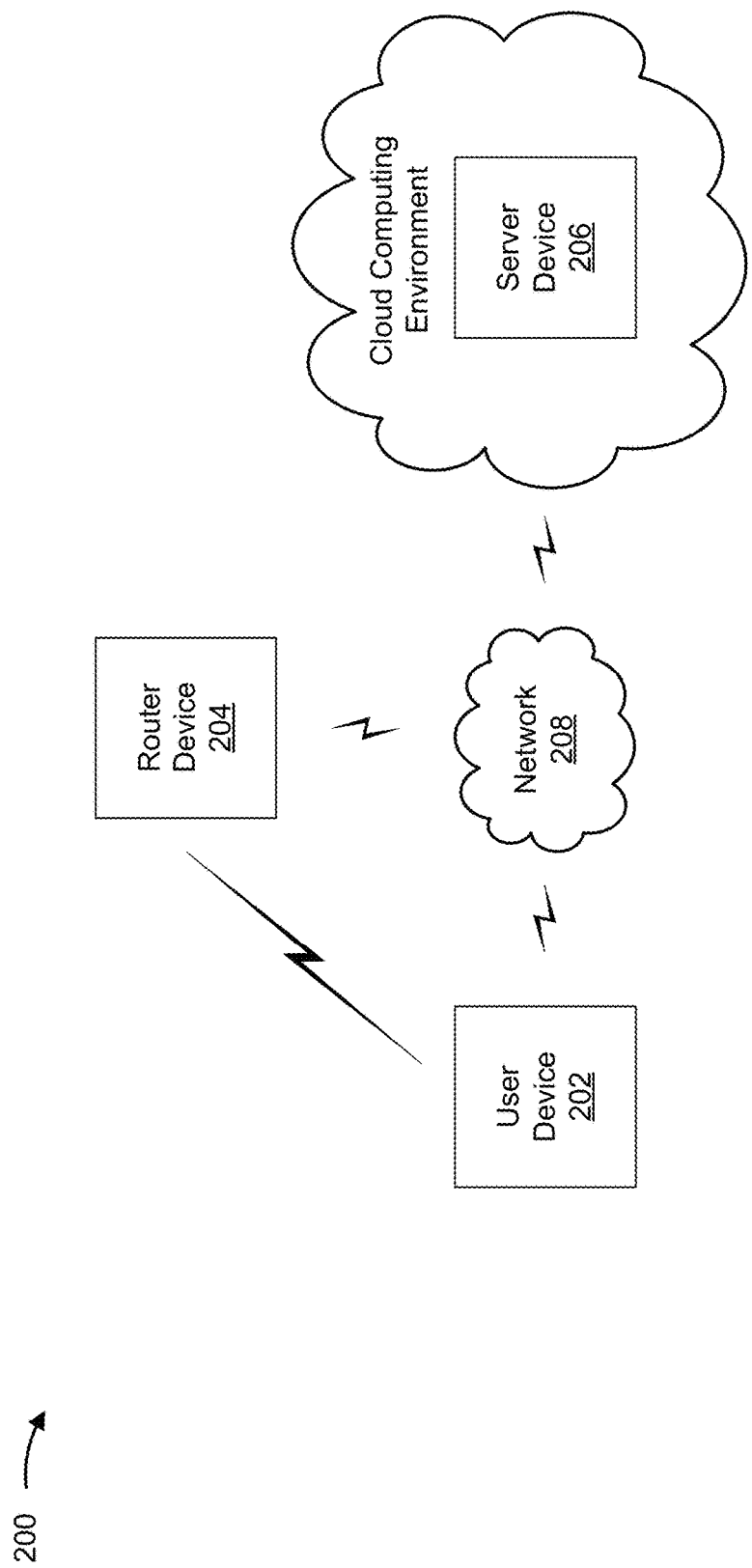
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 202, a router device 204, a server device 206, and/or a network 208. Devices of environment 200 may interconnect via wired connections, wireless connections, or a combination of wired and wireless connections.

User device 202 includes one or more devices capable of receiving, generating, storing, processing, and/or providing information, such as information described herein. For example, user device 202 may include a computer (e.g., a desktop computer, a laptop computer, a tablet computer, a handheld computer, a server device, and/or the like), a mobile phone (e.g., a smart phone, a radiotelephone, and/or the like), an internet of things (IoT) device or smart appliance, a set-top box, a gaming device, a wearable device (e.g., smart glasses), or a similar device. In some implementations, the user device 202 may include or may have access to a data structure to maintain a local version of a file. In some implementations, user device 202 may receive information from and/or transmit information to router device 204 (e.g., via a direction connection, via network 208, and/or the like).

Router device 204 includes one or more devices capable of receiving, generating, storing, processing, and/or providing information, such as information described herein. For example, router device 204 may be a customer premises equipment (CPE) that includes a multi-function networking device that may combine the functions of a Digital Subscriber Line (DSL) or cable modem, a cellular modem (e.g., a long term evolution (LTE) modem, a 5G modem, a 5G mmW modem, and/or the like), a firewall, a router, a network switch, and/or a wireless access point into a single device. Router device 204 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used by router device 204. Router device 204 may also include one or more wired (e.g., Ethernet) connections. In some implementations, router device 204 may provide the user device 202 access to the network 208. In some implementations, the router device may include or may have access to a data structure to maintain a cached version of a file. In some implementations, router device 204 may receive information from and/or transmit information to user device 202 (e.g., via a direct connection, via network 208, and/or the like) and/or server device 206 (e.g., via network 208).

Server device 206 includes one or more devices capable of receiving, generating, storing, processing, and/or providing information, such as information described herein. For example, server device 206 may include a server, a group of servers, a desktop computer, a laptop computer, a multicast and broadcast function device (MCBC), a multi-access edge computing (MEC) device, a database, and/or a similar type of device. In some implementations, the server device 206 include or may have access to a data structure to maintain a master version of a file. In some implementations, server device 206 may receive information from and/or transmit information to router device 204 (e.g., via network 208).

As shown in FIG. 2, server device 206 may be associated with a cloud computing environment. For example, server device 206 may be a MEC device associated with a far edge and/or an edge of the cloud computing environment. As another example, the server device may be a server associated with a central cloud of the cloud computing environment.

Network 208 includes one or more wired and/or wireless networks. For example, network 208 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
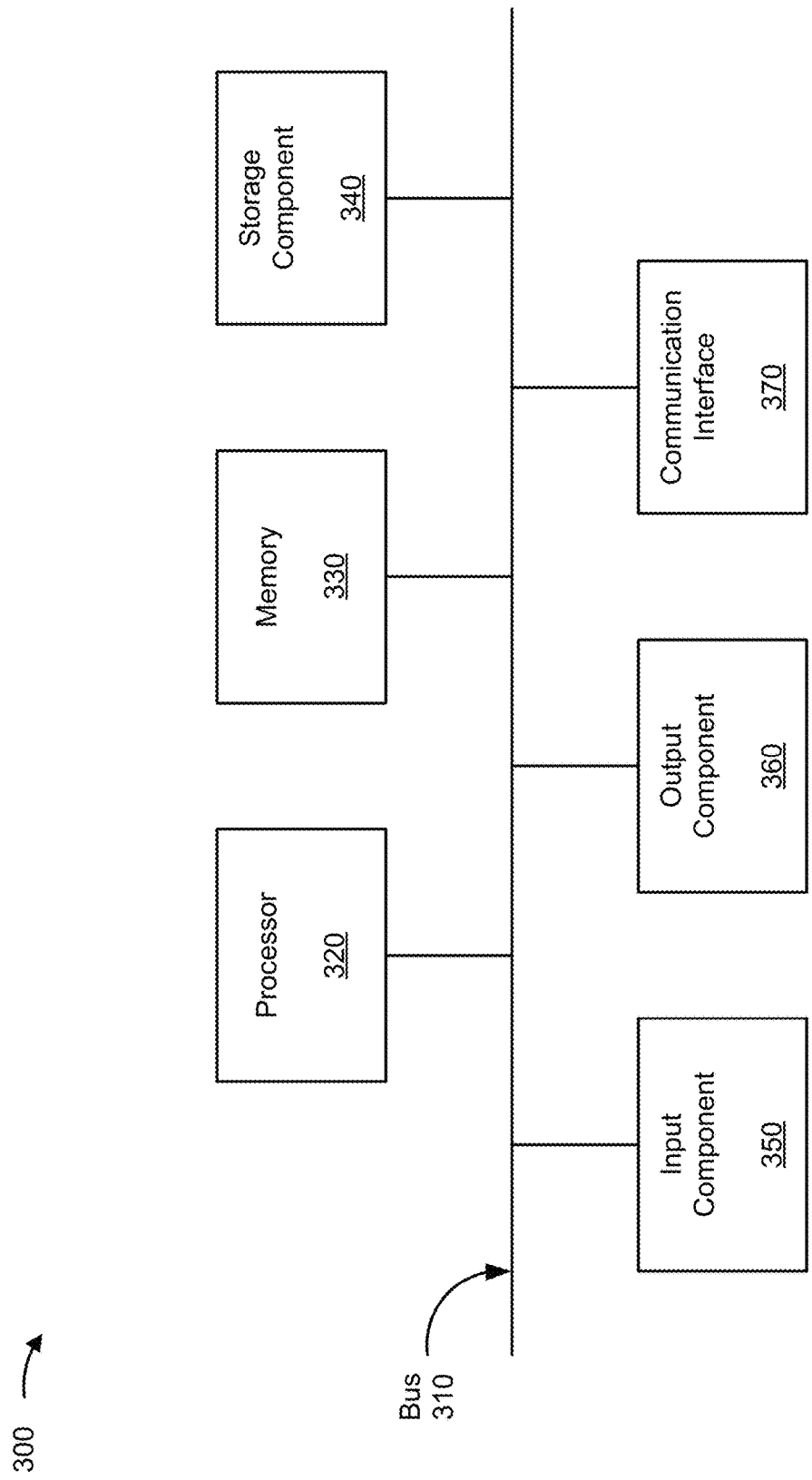
FIG. 3 is a diagram of example components of one or more devices of FIG. 2.

FIG. 3 is a diagram of example components of a device 300. Device 300 may correspond to user device 202, router device 204, and/or server device 206. In some implementations, user device 202, router device 204, and/or server device 206 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
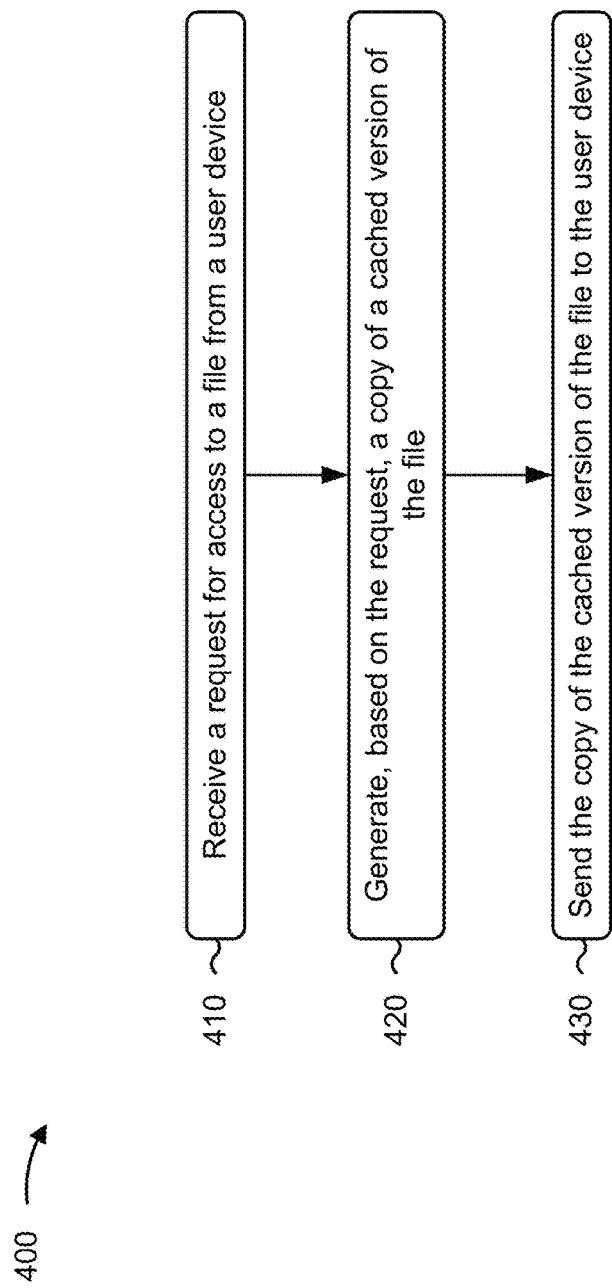
FIGS. 4-8 are flowcharts of example processes associated with maintaining a cached version of a file at a router device.

FIG. 4 is a flowchart of an example process 400 associated with maintaining a cached version of a file at a router device. In some implementations, one or more process blocks of FIG. 4 may be performed by a router device (e.g., router device 104 and/or router device 204). In some implementations, one or more process blocks of FIG. 4 may be performed by another device or a group of devices separate from or including the router device, such as a user device (e.g., user device 102 and/or user device 202), a server device (e.g., server device 106 and/or server device 206), and/or the like.

As shown in FIG. 4, process 400 may include receiving a request for access to a file from a user device (block 410). For example, the router device (e.g., using processor 320, memory 330, storage component 340, input component 350, output component 360, communication interface 370, and/or the like) may receive a request for access to a file from a user device, as described above. In some implementations, a master version of the file is stored in a data structure associated with a server device.

As further shown in FIG. 4, process 400 may include generating a copy of a cached version of the file (block 420). For example, the router device (e.g., using processor 320, memory 330, storage component 340, input component 350, output component 360, communication interface 370, and/or the like) may generate a copy of a cached version of the file, as described above. In some implementations, the router device 104 may generate the copy of the cached version of the filed based on the request. The cached version of the file may be stored in a data structure associated with the router device.

In some implementations, generating the copy of the cached version of the file comprises determining that the cached version of the file is stored in the data structure associated with the router device; generating, based on the cached version of the file, a current version validation request; sending the current version validation request to the server device that is associated with the data structure that stores the master version of the file; receiving, after sending the current version validation request, a current version validation confirmation from the server device; and generating, based on the current version validation confirmation, the copy of the cached version of the file. In some implementations, generating the current version validation request comprises processing the cached version of the file using a checksum procedure to generate a representative value of the cached version of the file, and generating the current version validation request to include the representative value.

In some implementations, generating the copy of the cached version of the file comprises determining that the cached version of the file is stored in the data structure associated with the router device; communicating with the server device that is associated with the data structure that stores the master version of the file to determine that the cached version of the file is not current; obtaining, based on determining that the cached version of the file is not current, a copy of the master version of the file from the server device; causing, based on the master version of the file, the cached version of the file to be updated; and generating, after causing the cached version of the file to be updated, the copy of the cached version of the file.

In some implementations, generating the copy of the cached version of the file comprises determining that no cached version of the file is stored in the data structure associated with the router device; obtaining, based on determining that no cached version of the file is stored in the data structure associated with the router device, a copy of the master version of the file from the server device; storing the copy of the master version of the file as the cached version of the file in the data structure associated with the router device; and generating, after storing the copy of the master version of the file as the cached version of the file in the data structure associated with the router device, the copy of the cached version of the file. In some implementations, the data structure associated with the router device is a priority queue, and storing the copy of the master version of the file as the cached version of the file in the data structure associated with the router device comprises identifying metadata associated with the copy of the master version of the file; processing the metadata to identify a priority position in the data structure associated with the router device, and causing the copy of the master version of the file to be stored as the cached version of the file at the priority position in the data structure associated with the router device.

As further shown in FIG. 4, process 400 may include sending the copy of the cached version of the file to the user device (block 430). For example, the router device (e.g., using processor 320, memory 330, storage component 340, input component 350, output component 360, communication interface 370, and/or the like) may send the copy of the cached version of the file to the user device, as described above.

Process 400 may include additional implementations, such as any single implementation or any combination of implementations described below and/or in connection with one or more other processes described elsewhere herein.

In some implementations, process 400 further includes receiving a local version of the file from the user device; storing the local version of the file as the cached version of the file in the data structure associated with the router device; and sending the local version of the file to the server device to cause the master version of the file to be updated. In some implementations, sending the local version of the file to the server device to cause the master version of the file to be updated comprises identifying one or more network conditions associated with the router device; determining, based on the one or more network conditions, a time to send the local version of the file; and sending the local version of the file to the server device at the determined time to cause the master version of the file to be updated.

In some implementations, process 400 further includes receiving an updated master version of the file from the server device and storing the updated master version of the file as the cached version of the file in the data structure associated with the router device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
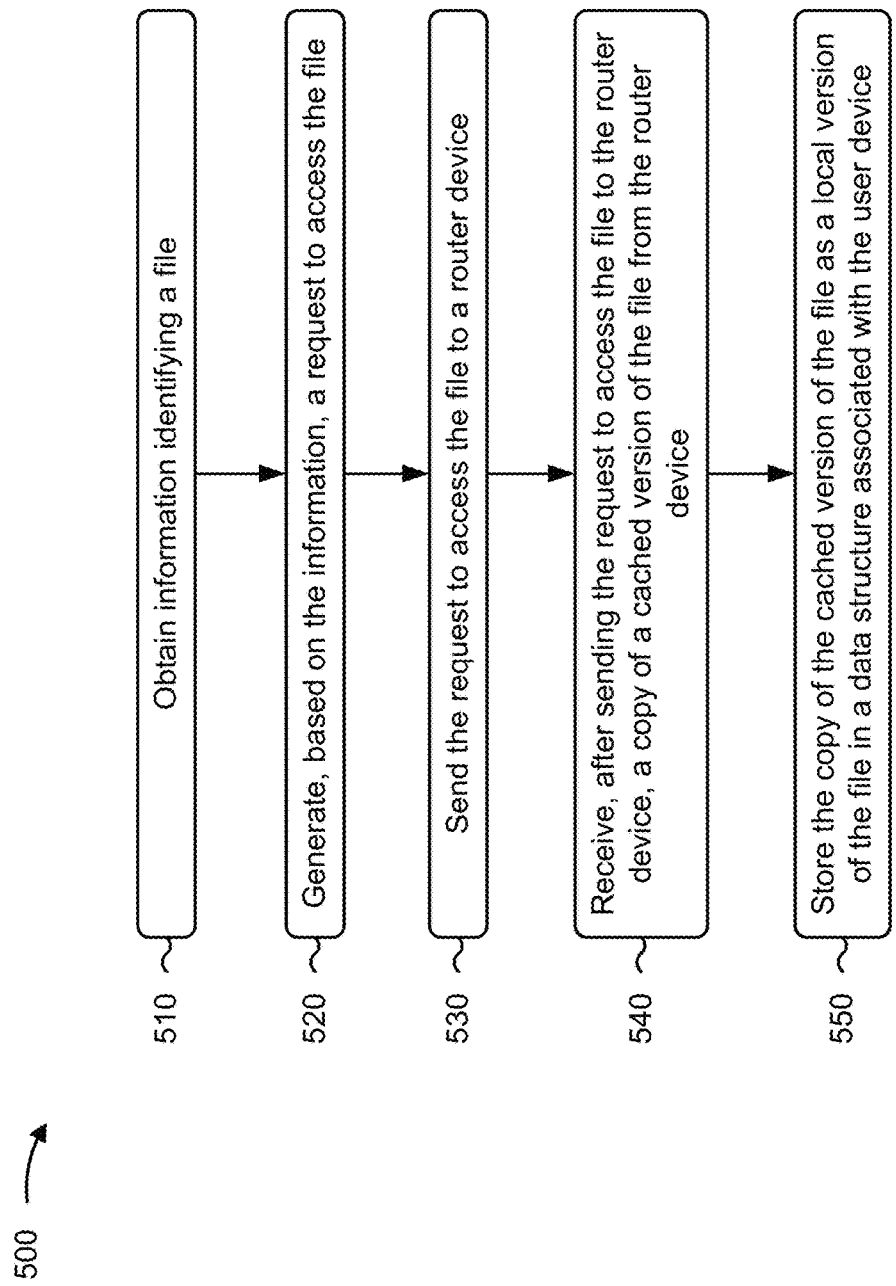

FIG. 5 is a flowchart of an example process 500 associated with maintaining a cached version of a file at a router device. In some implementations, one or more process blocks of FIG. 5 may be performed by a user device (e.g., user device 102 and/or user device 202). In some implementations, one or more process blocks of FIG. 5 may be performed by another device or a group of devices separate from or including the user device, such as a router device (e.g., router device 104 and/or router device 204), a server device (e.g., server device 106 and/or server device 206), and/or the like.

As shown in FIG. 5, process 500 may include obtaining information identifying a file (block 510). For example, the user device (e.g., using processor 320, memory 330, storage component 340, input component 350, output component 360, communication interface 370, and/or the like) may obtain, via a user interface of the user device, information identifying a file, as described above. In some implementations, a master version of the file is stored in a data structure associated with a server device.

As further shown in FIG. 5, process 500 may include generating a request to access the file (block 520). For example, the user device (e.g., using processor 320, memory 330, storage component 340, input component 350, output component 360, communication interface 370, and/or the like) may generate a request to access the file, as described above. In some implementations, the user device may generate the request to access the file based on the information.

As further shown in FIG. 5, process 500 may include sending the request to access the file to a router device (block 530). For example, the user device (e.g., using processor 320, memory 330, storage component 340, input component 350, output component 360, communication interface 370, and/or the like) may send the request to access the file to a router device, as described above.

As further shown in FIG. 5, process 500 may include receiving a copy of a cached version of the file from the router device (block 540). For example, the user device (e.g., using processor 320, memory 330, storage component 340, input component 350, output component 360, communication interface 370, and/or the like) may receive a copy of a cached version of the file from the router device, as described above. In some implementations, the user device may receive the copy of the cached version of the file from the router device after sending the request to access the file to the router device. The cached version of the file may be stored in a data structure associated with the router device.

As further shown in FIG. 5, process 500 may include storing the copy of the cached version of the file as a local version of the file in a data structure associated with the user device (block 550). For example, the user device (e.g., using processor 320, memory 330, storage component 340, input component 350, output component 360, communication interface 370, and/or the like) may store the copy of the cached version of the file as a local version of the file in a data structure associated with the user device, as described above.

Process 500 may include additional implementations, such as any single implementation or any combination of implementations described below and/or in connection with one or more other processes described elsewhere herein.

In some implementations, process 500 further includes obtaining, via the user interface of the user device, one or more updates associated with the local version of the file; causing, based on the one or more updates, the local version of the file to be updated in the data structure associated with the user device; generating, after causing the local version of the file to be updated in the data structure associated with the user device, a copy of the local version of the file; and sending the copy of the local version of the file to the router device, to cause the cached version of the file stored in the data structure associated with the router device to be updated.

In some implementations, process 500 further includes receiving, after storing the copy of the cached version of the file as the local version of the file in the data structure associated with the user device, a copy of an updated cached version of the file from the router device; and storing the copy of the updated cached version of the file as the local version of the file in the data structure associated with the user device.

In some implementations, process 500 further includes receiving, after storing the copy of the cached version of the file as the local version of the file in the data structure associated with the user device, a copy of an updated cached version of the file from the router device; causing display, on a display of the user device, of a message indicating that the copy of the updated cached version of the file has been received by the user device; receiving, based on causing display of the message and via the user interface of the user device, input indicating that the local version of the file is to be updated; and storing the copy of the updated cached version of the file as the local version of the file in the data structure associated with the user device.

In some implementations, process 500 further includes receiving, after storing the copy of the cached version of the file as the local version of the file in the data structure associated with the user device, a copy of an updated cached version of the file from the router device; receiving, after receiving the copy of the updated cached version of the file and via the user interface of the user device, input indicating that the local version of the file is to not be updated; and discarding the copy of the updated cached version of the file.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
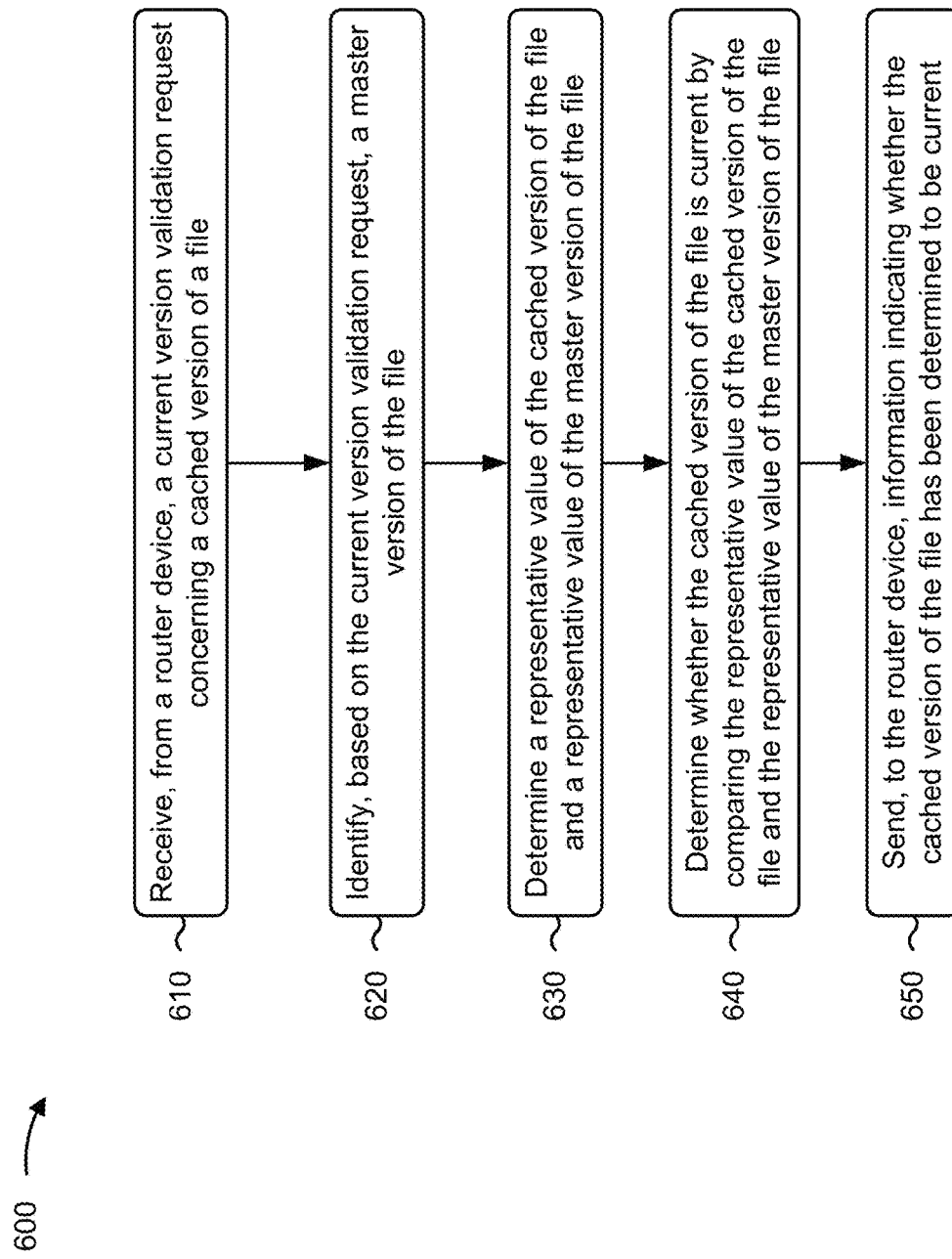

FIG. 6 is a flowchart of an example process 600 associated with maintaining a cached version of a file at a router device. In some implementations, one or more process blocks of FIG. 6 may be performed by a server device (e.g., server device 106 and/or server device 206). In some implementations, one or more process blocks of FIG. 6 may be performed by another device or a group of devices separate from or including the router device, such as a user device (e.g., user device 102 and/or user device 202), a router device (e.g., router device 104 and/or router device 204), and/or the like.

As shown in FIG. 6, process 600 may include receiving, from a router device, a current version validation request concerning a cached version of a file (block 610). For example, the server device (e.g., using processor 320, memory 330, storage component 340, input component 350, output component 360, communication interface 370, and/or the like) may receive, from a router device, a current version validation request concerning a cached version of a file, as described above. In some implementations, the cached version of the file is stored in a data structure associated with the router device.

As further shown in FIG. 6, process 600 may include identifying a master version of the file (block 620). For example, the server device (e.g., using processor 320, memory 330, storage component 340, input component 350, output component 360, communication interface 370, and/or the like) may identify a master version of the file, as described above. In some implementations, the server device may identify the master version of the file based on the current version validation request. The master version of the file may be stored in a data structure associated with the server device.

As further shown in FIG. 6, process 600 may include determining a representative value of the cached version of the file and a representative value of the master version of the file (block 630). For example, the server device (e.g., using processor 320, memory 330, storage component 340, input component 350, output component 360, communication interface 370, and/or the like) may determine a representative value of the cached version of the file and a representative value of the master version of the file, as described above.

In some implementations, determining the representative value of the cached version of the file and the representative value of the master version of the file includes processing the current version validation request to identify the representative value of the cached version of the file that is included in the current version validation request; identifying, based on the representative value of the cached version of the file, a validation procedure that was used to generate the representative value of the cached version of the file; and processing the master version of the file using the validation procedure to generate the representative value of the master version of the file.

As further shown in FIG. 6, process 600 may include determining whether the cached version of the file is current (block 640). For example, the server device (e.g., using processor 320, memory 330, storage component 340, input component 350, output component 360, communication interface 370, and/or the like) may determine whether the cached version of the file is current, as described above. In some implementations, the server device may determine whether the cached version of the file is current by comparing the representative value of the cached version of the file and the representative value of the master version of the file.

As further shown in FIG. 6, process 600 may include sending, to the router device, information indicating whether the cached version of the file has been determined to be current (block 650). For example, the server device (e.g., using processor 320, memory 330, storage component 340, input component 350, output component 360, communication interface 370, and/or the like) may send, to the router device, information indicating whether the cached version of the file has been determined to be current, as described above.

Process 600 may include additional implementations, such as any single implementation or any combination of implementations described below and/or in connection with one or more other processes described elsewhere herein.

In some implementations, process 600 further includes receiving, from the router device, a request for a copy of the master version of the file; generating, based on the request, the copy of the master version of the file; and sending, to the router device, the copy of the master version of the file.

In some implementations, process 600 further includes receiving, from the router device, a copy of the cached version of the file; and storing the copy of the cached version of the file as the master version of the file in the data structure associated with the server device.

In some implementations, process 600 further includes receiving, from the router device, a copy of the cached version of the file; storing the copy of the cached version of the file as the master version of the file in the data structure associated with the server device; identifying, after storing the copy of the cached version of the file as the master version of the file in the data structure associated with the server device, another device that stores a version of the file in a data structure associated with the other device; and sending a copy of the master version of the file to the other device.

In some implementations, the server device is associated with a far edge, an edge, or a central cloud of a cloud computing environment.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
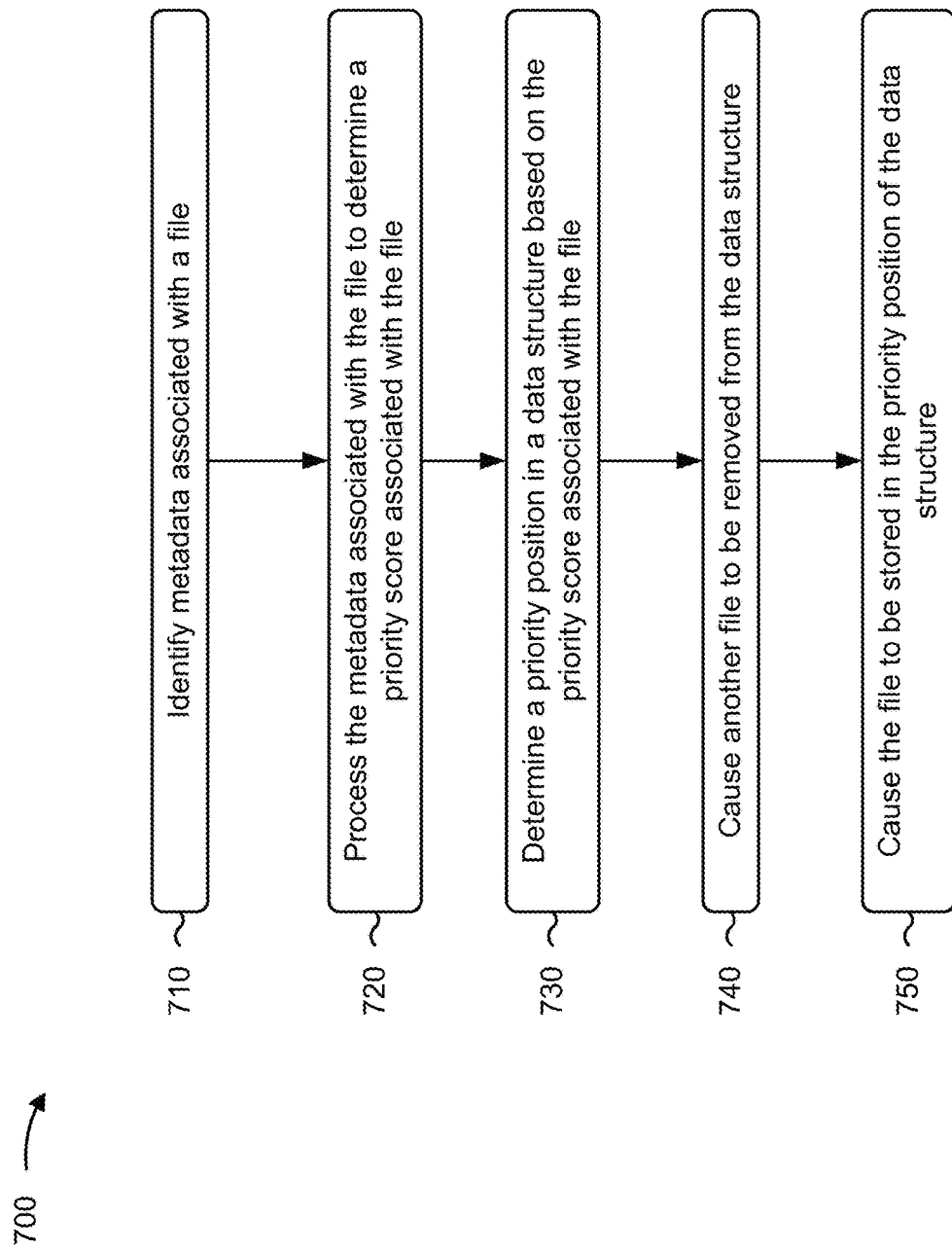

FIG. 7 is a flowchart of an example process 700 associated with maintaining a cached version of a file at a router device. In some implementations, one or more process blocks of FIG. 7 may be performed by a router device (e.g., router device 104 and/or router device 204). In some implementations, one or more process blocks of FIG. 7 may be performed by another device or a group of devices separate from or including the router device, such as a user device (e.g., user device 102 and/or user device 202), a server device (e.g., server device 106 and/or server device 206), and/or the like.

As shown in FIG. 7, process 700 may include identifying metadata associated with a file (block 710). For example, the router device (e.g., using processor 320, memory 330, storage component 340, input component 350, output component 360, communication interface 370, and/or the like) may identify metadata associated with a file, as described above.

As shown in FIG. 7, process 700 may include processing the metadata associated with the file to determine a priority score associated with the file (block 720). For example, the router device (e.g., using processor 320, memory 330, storage component 340, input component 350, output component 360, communication interface 370, and/or the like) may process the metadata associated with the file to determine a priority score associated with the file, as described above.

As shown in FIG. 7, process 700 may include determining a priority position in a data structure based on the priority score associated with the file (block 730). For example, the router device (e.g., using processor 320, memory 330, storage component 340, input component 350, output component 360, communication interface 370, and/or the like) may determine a priority position in a data structure based on the priority score associated with the file, as described above. In some implementations, the data structure may be a priority queue.

As shown in FIG. 7, process 700 may include causing another file to be removed from the data structure (block 740). For example, the router device (e.g., using processor 320, memory 330, storage component 340, input component 350, output component 360, communication interface 370, and/or the like) may cause another file to be removed from the data structure, as described above. In some implementations, the other file may be associated with a lowest priority position in the data structure.

As shown in FIG. 7, process 700 may include causing the file to be stored in the priority position of the data structure (block 750). For example, the router device (e.g., using processor 320, memory 330, storage component 340, input component 350, output component 360, communication interface 370, and/or the like) may cause the file to be stored in the priority position of the data structure, as described above.

Process 700 may include additional implementations, such as any single implementation or any combination of implementations described in connection with one or more other processes described elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
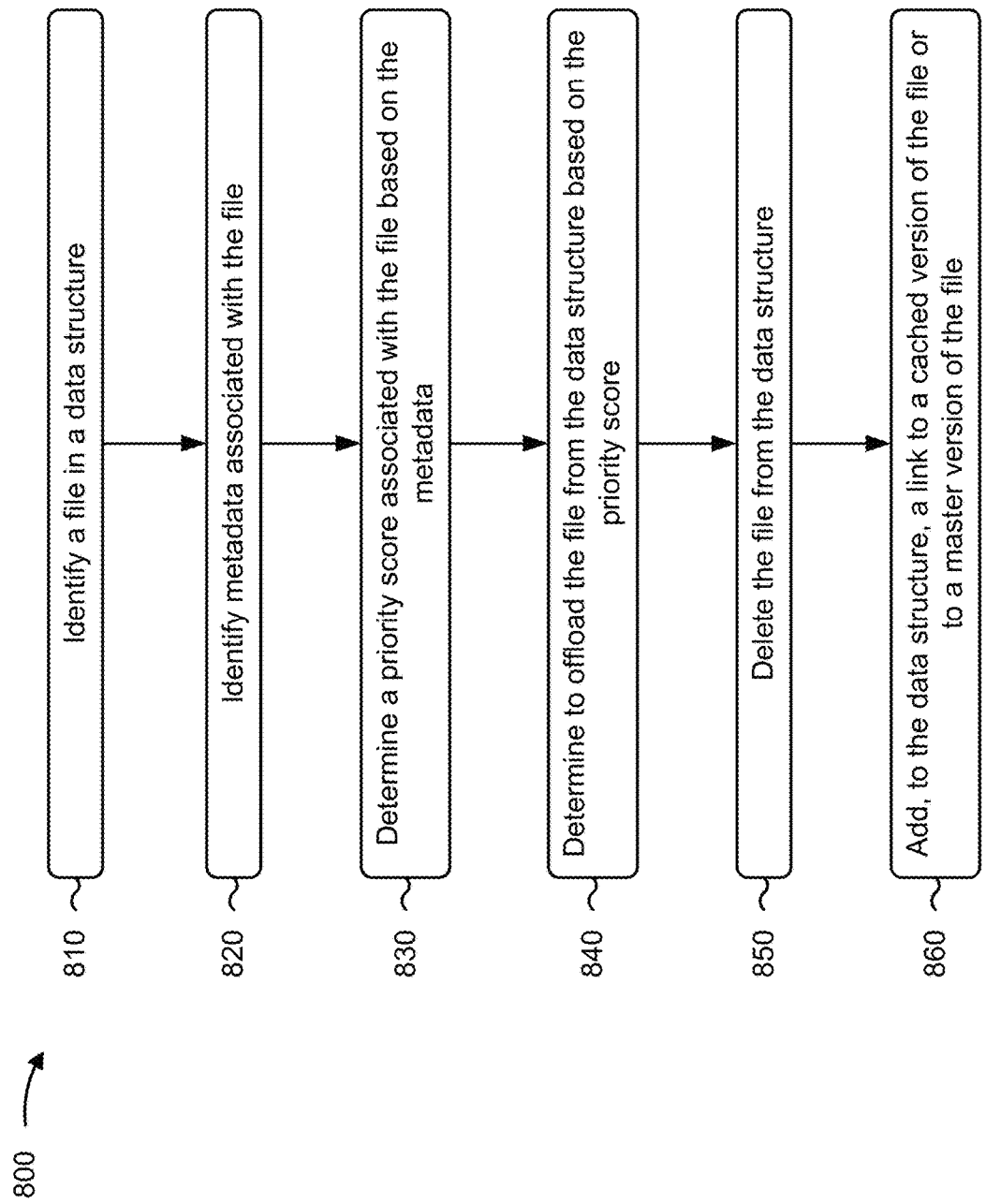

FIG. 8 is a flowchart of an example process 800 associated with maintaining a cached version of a file at a router device. In some implementations, one or more process blocks of FIG. 8 may be performed by a user device (e.g., user device 102 and/or user device 202). In some implementations, one or more process blocks of FIG. 8 may be performed by another device or a group of devices separate from or including the router device, such as a router device (e.g., router device 104 and/or router device 204), a server device (e.g., server device 106 and/or server device 206), and/or the like.

As shown in FIG. 8, process 800 may include identifying a file in a data structure (block 810). For example, the user device (e.g., using processor 320, memory 330, storage component 340, input component 350, output component 360, communication interface 370, and/or the like) may identify a local version of a file in a data structure, as described above. In some implementations, the user device may search one or more directory locations of the data structure to find and identify the file.

As shown in FIG. 8, process 800 may include identifying metadata associated with the file (block 820). For example, the user device (e.g., using processor 320, memory 330, storage component 340, input component 350, output component 360, communication interface 370, and/or the like) may identify metadata associated with the file, as described above.

As shown in FIG. 8, process 800 may include determining a priority score associated with the file based on the metadata (block 830). For example, the user device (e.g., using processor 320, memory 330, storage component 340, input component 350, output component 360, communication interface 370, and/or the like) may determine a priority score associated with the file based on the metadata, as described above.

As shown in FIG. 8, process 800 may include determining to offload the file from the data structure based on the priority score (block 840). For example, the user device (e.g., using processor 320, memory 330, storage component 340, input component 350, output component 360, communication interface 370, and/or the like) may determine to offload the file from the data structure based on the priority score, as described above.

As shown in FIG. 8, process 800 may include deleting the file from the data structure (block 850). For example, the user device (e.g., using processor 320, memory 330, storage component 340, input component 350, output component 360, communication interface 370, and/or the like) may delete the file from the data structure, as described above. In some implementations, the user device may delete the file from the data structure based on determining to offload the file from the data structure.

As shown in FIG. 8, process 800 may include adding, to the data structure, a link to a cached version of the file or to a master version of the file (block 860). For example, the user device (e.g., using processor 320, memory 330, storage component 340, input component 350, output component 360, communication interface 370, and/or the like) may add, to the data structure, a link to a cached version of the file or to a master version of the file, as described above. In some implementations, the user device may add, to the data structure, the link to the cached version of the file or to the master version of the file based on determining to offload the file from the data structure.

Process 800 may include additional implementations, such as any single implementation or any combination of implementations described in connection with one or more other processes described elsewhere herein.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a router device, a copy of a file;
   identifying, by the router device, metadata associated with the copy of the file;
   processing, by the router device, the metadata to identify a priority position in a first data structure associated with the router device;
   causing, by the router device, a copy of the file to be stored as a cached version of the file at the priority position in the first data structure;
   generating, by the router device, a copy of the cached version of the file; and
   sending, by the router device, the copy of the cached version of the file to a user device.

2. The method of claim 1, wherein generating the copy of the cached version of the file comprises:
   determining that the cached version of the file is stored in the first data structure;
   generating, based on the cached version of the file, a current version validation request;
   sending the current version validation request to a server device,
      wherein the server device is associated with a second data structure that stores a master version of the file;
   receiving, after sending the current version validation request, a current version validation confirmation from the server device; and
   generating, based on receiving the current version validation confirmation, the copy of the cached version of the file.

3. The method of claim 1, wherein the metadata includes information indicating at least one of:
   a number of accesses associated with the file,
   a location of another cached version of the file,
   a last access date associated with the file,
   a creation date of the file,
   a last access location of the file,
   whether the file is a favorite file,
   a size of the file, or
   a type of the file.

4. The method of claim 1, wherein generating the copy of the cached version of the file comprises:
   determining that the cached version of the file is stored in the first data structure;
   communicating with a server device to determine that the cached version of the file is not current,
      wherein the server device is associated with a second data structure that stores a master version of the file;
   obtaining, based on determining that the cached version of the file is not current, a copy of the master version of the file from the server device;
   causing, based on obtaining the master version of the file, the cached version of the file to be updated; and generating, after causing the cached version of the file to be updated, the copy of the cached version of the file.

5. The method of claim 1, wherein receiving the copy of the file comprises:
receiving, from a server device, the copy of the file,
wherein the copy of the file is a copy of a master version of the file.

6. The method of claim 1, wherein receiving the copy of the file comprises:
receiving the copy of the file from the user device.

7. The method of claim 1, wherein receiving the copy of the file comprises:
receiving the copy of the file from the user device,
wherein the copy of the file is a copy of a local version of the file;
and
wherein the method further comprises:
sending the copy of the file to a server device to cause a master version of the file to be updated.

8. The method of claim 7, wherein sending the copy of the file to the server device comprises:
identifying one or more network conditions associated with the router device;
determining, based on the one or more network conditions, a time to send the copy of the file; and
sending the copy of the file to the server device at the time to cause the master version of the file to be updated.

9. The method of claim 1, further comprising:
receiving an updated master version of the file from a server device; and
storing the updated master version of the file as the cached version of the file in first the data structure.

10. A user device, comprising:
one or more processors configured to:
receive, from a router device, a copy of a cached version of a file,
wherein the cached version of the file is stored in a first data structure associated with the router device;
store the copy of the cached version of the file as a local version of the file in a second data structure associated with the user device;
receive, from the router device, a copy of an updated cached version of the file;
receive input indicating whether the local version of the file is to be updated; and
perform an action based on the input,
wherein the action includes one of:
storing the copy of the updated cached version of the file as the local version of the file in the second data structure, or
discarding the copy of the updated cached version of the file.

11. The user device of claim 10, wherein the action includes storing the copy of the updated cached version of the file as the local version of the file in the second data structure.

12. The user device of claim 10, wherein the one or more processors are further configured to:
obtain, via a user interface of the user device, information identifying the file; and
send a request to access the file to the router device.

13. The user device of claim 10, wherein the one or more processors are further configured to:
select the file, from a set of files, to be backed up to the router device as the cached version of the file.

14. The user device of claim 10, wherein the action includes discarding the copy of the updated cached version of the file.

15. A non-transitory computer-readable medium storing instructions, the instructions comprising:
one or more instructions that, when executed by one or more processors of a server device, cause the one or more processors to:
receive, from a router device, a current version validation request concerning a cached version of a file;
identify, based on the current version validation request, a master version of the file;
process the current version validation request to identify a first representative value of the cached version of the file;
process the master version of the file using a validation procedure, used to generate the first representative value, to generate a second representative value of the master version of the file;
determine whether the cached version of the file is current by comparing the first representative value and the second representative value; and
send, to the router device, information indicating whether the cached version of the file has been determined to be current.

16. The non-transitory computer-readable medium of claim 15, wherein the one or more instructions, when executed by the one or more processors, further cause the one or more processors to:
receive, from the router device, a request for a copy of the master version of the file;
generate, based on the request, the copy of the master version of the file; and
send, to the router device, the copy of the master version of the file.

17. The non-transitory computer-readable medium of claim 15, wherein the one or more instructions, when executed by the one or more processors, further cause the one or more processors to:
receive, from the router device, a copy of the cached version of the file; and
store the copy of the cached version of the file as the master version of the file in a data structure associated with the server device.

18. The non-transitory computer-readable medium of claim 15, wherein the one or more instructions, when executed by the one or more processors, further cause the one or more processors to:
receive, from the router device, a copy of the cached version of the file;
store the copy of the cached version of the file as the master version of the file in a data structure associated with the server device;
identify, after storing the copy of the cached version of the file as the master version of the file in the data structure associated with the server device, another device that stores a version of the file in a data structure associated with the other device; and
send a copy of the master version of the file to the other device.

19. The non-transitory computer-readable medium of claim 15, wherein the server device is associated with a far edge, an edge, or a central cloud of a cloud computing environment.

20. The non-transitory computer-readable medium of claim 15, wherein the one or more instructions, that cause the one or more processors to send the information indicating whether the cached version of the file has been determined to be current, cause the one or more processors to:
   send a current version validation confirmation to the router device when the cached version of the file is determined to be current, or
   send a current version validation denial to the router device when the cached version of the file is determined to be not current.

\* \* \* \* \*